(12) United States Patent
Nishimura (10) Patent No.: US 6,373,164 B1
(45) Date of Patent: Apr. 16, 2002

(54) STATOR FOR DYNAMO-ELECTRIC MACHINE

(75) Inventor: Shinji Nishimura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/711,072

(22) Filed: Nov. 14, 2000

(30) Foreign Application Priority Data

May 10, 2000 (JP) ........................................ 2000-137084

(51) Int. Cl.[7] .............................. H02K 3/00; H02K 3/04
(52) U.S. Cl. ...................... 310/207; 310/198; 310/184
(58) Field of Search .................................. 310/207, 203, 310/195, 179, 208, 201, 198, 184, 180, 254

(56) References Cited

U.S. PATENT DOCUMENTS

| | | | | |
|---|---|---|---|---|
| 3,531,672 A | * | 9/1970 | King ............................ | 310/207 |
| 3,979,618 A | * | 9/1976 | Auinger ....................... | 310/198 |
| 4,619,040 A | * | 10/1986 | Wang et al. ................... | 29/596 |
| 5,508,571 A | * | 4/1996 | Shafer, Jr. .................... | 310/179 |
| 5,616,977 A | * | 4/1997 | Hill .............................. | 29/596 |
| 5,886,444 A | * | 3/1999 | Enomoto et al. ............ | 310/179 |
| 6,170,974 B1 | * | 1/2001 | Hyypio .......................... | 716/4 |

FOREIGN PATENT DOCUMENTS

JP 7-44797 5/1995

\* cited by examiner

*Primary Examiner*—Elvin Enad
*Assistant Examiner*—Guillermo Perez
(74) *Attorney, Agent, or Firm*—Sughrue Mion, PLLC (57) ABSTRACT

A stator of a dynamo-electric machine includes: a cylindrical stator iron core formed with a number of slots opening to the inner periphery side at a predetermined pitch in a circumferential direction; and an armature coil having windings of first, second and third phases which are wound in a wave winding manner into every third slot by offsetting the slots, into which the respective windings of the first, second and third phases are inserted, one slot, wherein the windings of the first, second and third phases constitute coil ends in which they protrude from a first slot to an end face of the stator iron core outside the slots, extend along the end face of the stator iron core in the circumferential direction while maintaining the radial position, and then enter into a second slot three slots away from the first slot, and wherein the coil ends are arranged in the circumferential direction in the form of two layers arranged radially on the end faces of the stator iron core to constitute coil end groups.

6 Claims, 7 Drawing Sheets

STATOR FOR DYNAMO-ELECTRIC MACHINE

BACKGROUND OF THE INVENTION

1. Field of the Invention

The present invention relates in general to a stator for a dynamo-electric machine of, for example, a three phase induction electric motor, and more particularly to the construction of an armature coil which is wound on a stator.

2. Description of the Related Art

As described in Japanese Patent Examined Application No. Hei 7-44797 for example, a conventional armature coil is constructed in such a way that coil segments, each of which is formed into a general U shape, are successively inserted at intervals of three slots from one end side of a stator iron core and open ends of the coil segments each of which protrudes to the other end side of the stator iron core are joined to each other to obtain predetermined wiring construction.

In this conventional armature coil, V-shaped turn parts of the coil segments are arranged in the circumferential direction on one end of the stator iron core to construct one coil end group, while the joining portions of the open ends of the coil segments are arranged in the circumferential direction on the other end of the stator iron core to construct the other coil end group.

Then, in the conventional armature coil, there is an inconvenience that the axial height of the coil end groups is high so that the stator can not be miniaturized.

In order to solve such an inconvenience, there has been proposed an armature coil in which the coil ends are arranged along the end face of the stator iron core to decrease the axial height of the coil end groups.

Figure 5:
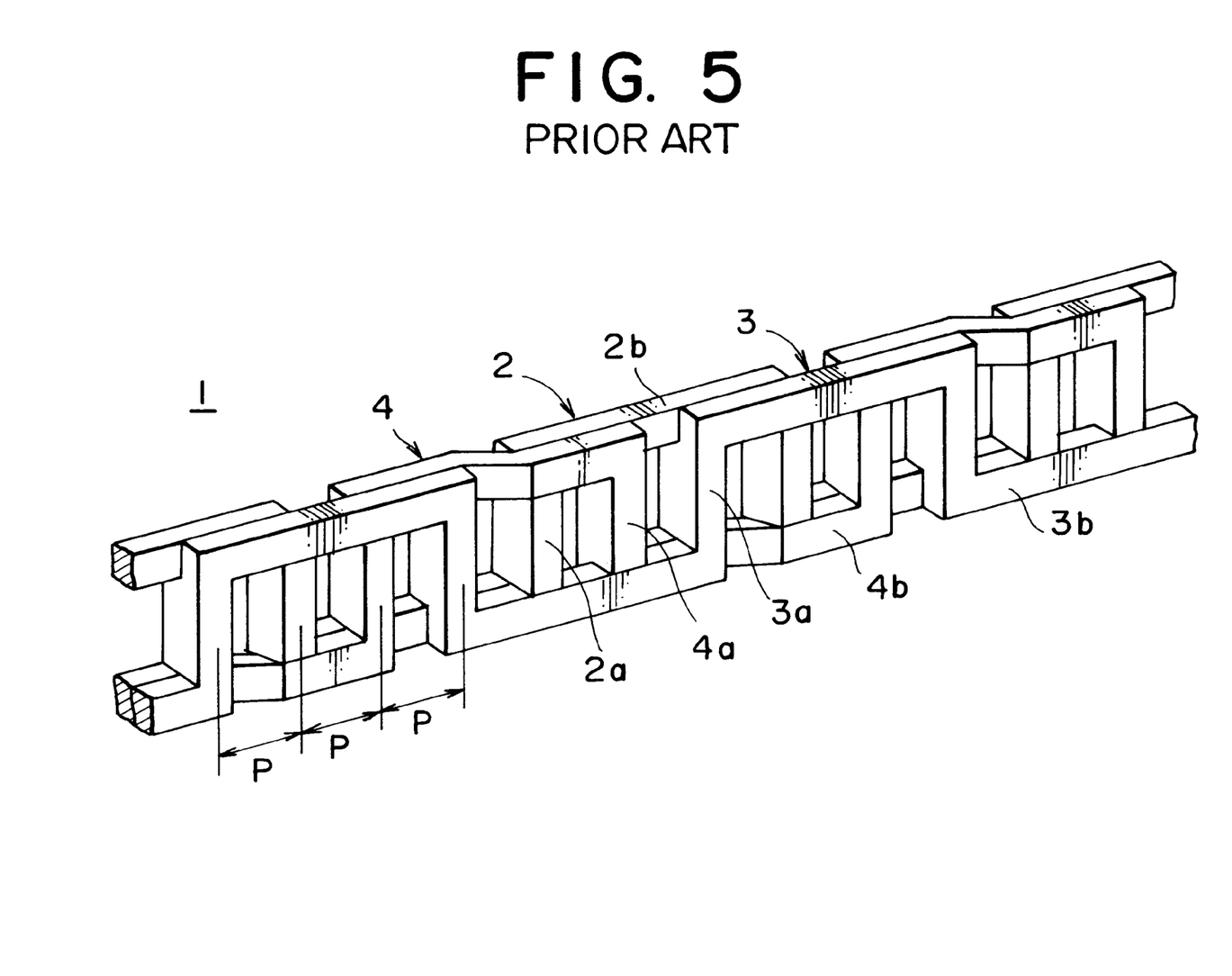
FIG. 5 is a developed perspective view showing a main part of a conventional armature coil which is applied to a stator for a three phase induction electric motor.
Figure 6:
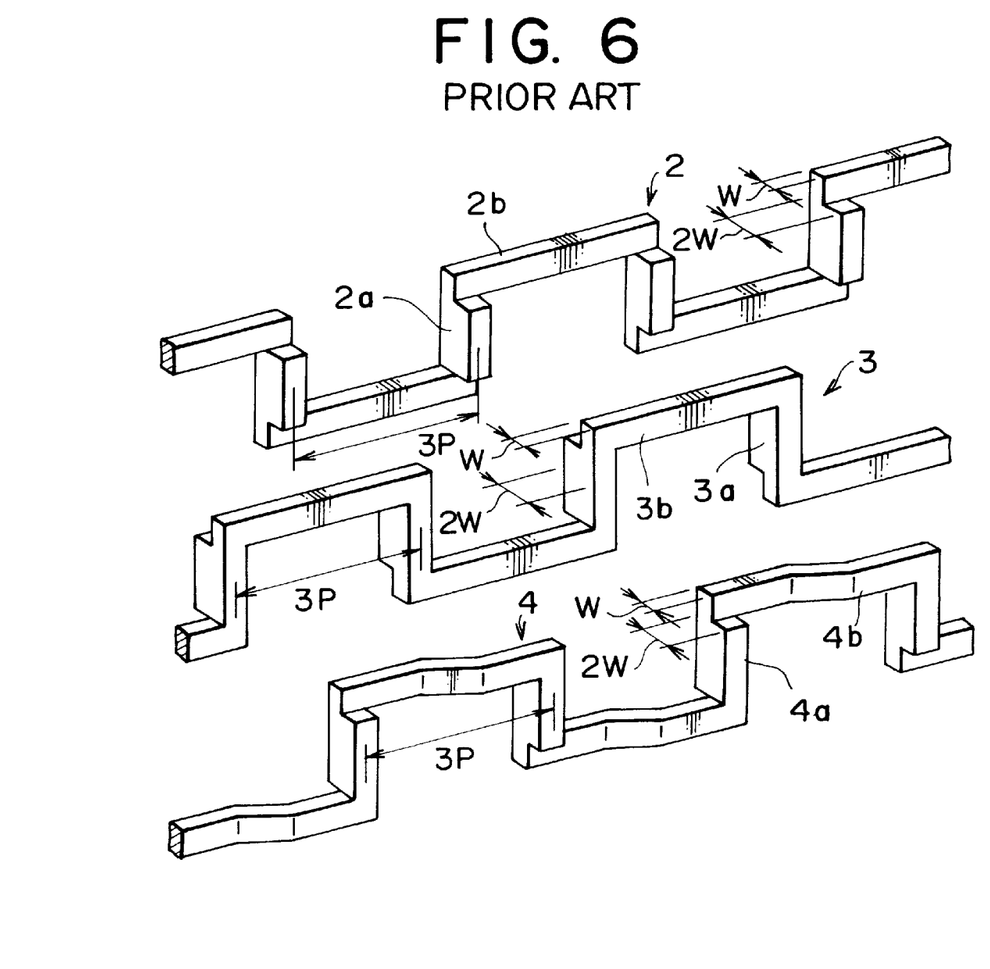
FIG. 6 is an exploded perspective view showing the armature coil shown in FIG. 5.

FIG. 5 is a developed perspective view showing a main part of an armature coil as the improvement measure which is applied to a stator of a conventional three phase induction electric motor, and FIG. 6 is an exploded perspective view of the armature coil shown in FIG. 5.

In FIGS. 5 and 6, an armature coil 1 is constituted of, for example, windings 2, 3 and 4 of first, second and third phases corresponding to a phase U, a phase V and a phase W, respectively. With respect to each of the winding 2 of the first phase, the winding 3 of the second phase, and the winding 4 of the third phase, a group of large number of copper wires each of which is coated with enamel and which are tied up in a bundle are subjected to the press forming to be formed into a desired shape.

The winding 2 of the first phase is constructed into a crank shape which includes slot accommodating parts 2a which are arranged at predetermined pitches (3P) and bridging parts 2b as the coil ends through each of which the end portions of the adjacent accommodating parts 2a are coupled to each other. Then, each of the slot accommodating parts 2a is formed into the shape having an outer diameter which is roughly equal to an inner diameter of the slot (not shown) of the stator iron core. In addition, each of the bridging parts 2b is formed in such a way that its width (w) in the direction of the slot depth is roughly half the width (2w) in the direction of the slot depth of the slot accommodating part 2a. Thus, the end portions, on one side in the direction of the slot depth, of the adjacent slot accommodating parts 2a are coupled to each other through the associated one of the bridging parts 2b.

The winding 3 of the second phase is constructed into a crank shape which includes slot accommodating parts 3a which are arranged at predetermined pitches (3P) and bridging parts 3b as the coil ends through each of which the end portions of the adjacent accommodating parts 3a are coupled to each other. Then, each of the slot accommodating parts 3a is formed into the shape having an outer diameter which is roughly equal to an inner diameter of the slot (not shown) of the stator iron core. In addition, each of the bridging parts 3b is formed in such a way that its width (w) in the direction of the slot depth is roughly half the width (2w) in the direction of the slot depth of the slot accommodating part 3a. Thus, the end portions, on the other side in the direction of the slot depth, of the adjacent slot accommodating parts 3a are coupled to each other through the associated one of the bridging parts 3b.

The winding 4 of the third phase is constructed into a crank shape which includes slot accommodating parts 4a which are arranged at predetermined pitches (3P) and bridging parts 4b as the coil ends through each of which the end parts of the adjacent accommodating parts 4a are coupled to each other. Then, each of the slot accommodating parts 4a is formed into the shape having an outer diameter which is roughly equal to an inner diameter of the slot (not shown) of the stator iron core. In addition, each of the bridging parts 4b is formed in such a way that its width (w) in the direction of the slot depth is roughly half the width (2w) in the direction of the slot depth of the slot accommodating part 4a. Thus, the end parts, on one side in the direction of the slot depth, of the adjacent slot accommodating parts 4a are coupled to the end parts thereof on the other side in the direction of the slot depth through the associated one of the bridging parts 4b. That is, each of the bridging parts 4b is shifted at the intermediate part thereof from one side to the other side in the direction of the slot depth.

The winding 2 of the first phase, the winding 3 of the second phase and the winding 4 of the third phase which are constructed in such a manner as described above are arranged with the slot accommodating parts 2a, 3a and 4a made shifted from each other by one slot (P) to construct the armature coil shown in FIG. 5.

Figure 7:
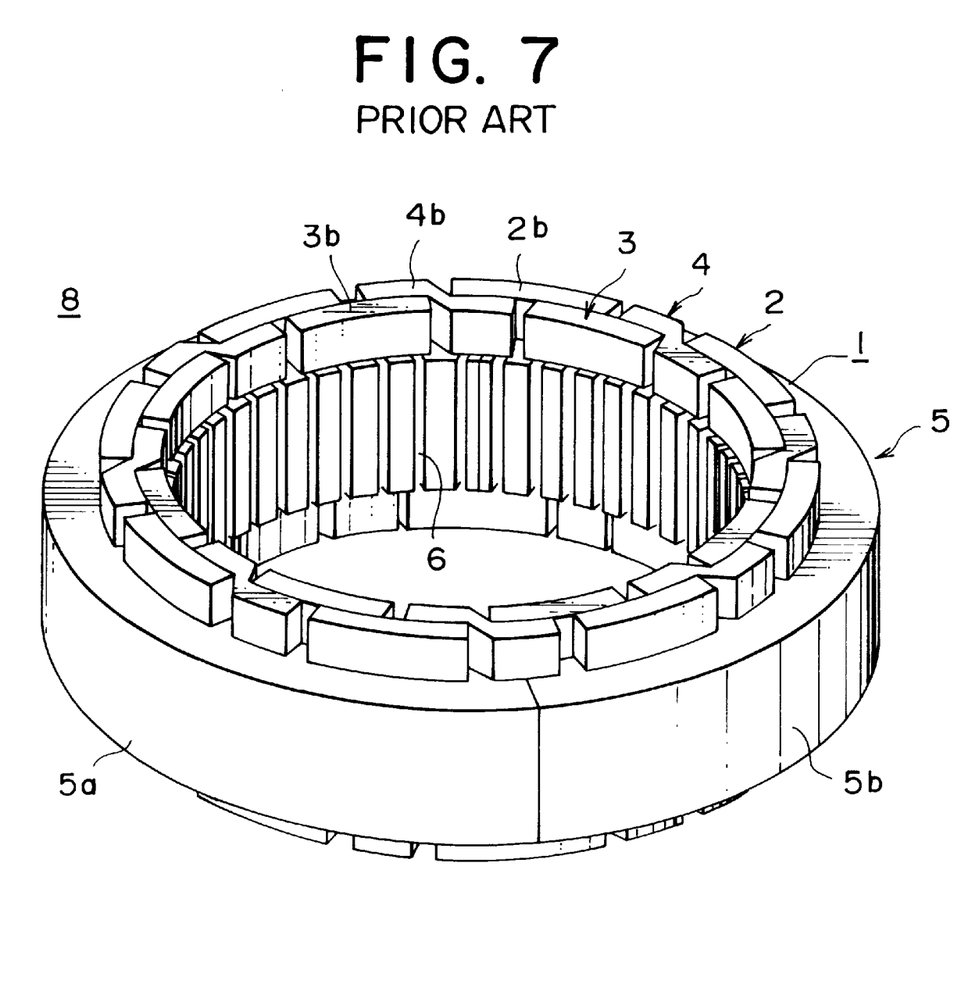
FIG. 7 is a perspective view showing a stator for a conventional three phase induction electric motor.

The armature coil 1 which has been constructed in such a manner is formed into a ring-like shape by the bending. Then, divided stator iron cores 5a and 5b are applied from the outer periphery side to the ring-like shaped armature coil 1 in such a way that the slot accommodating parts 2a, 3a and 4a are respectively accommodated into the associated ones of the slots 6, and then the end faces of the divided stator iron cores 5a and 5b are brought into contact with each other to be integrated with each other by the welding, whereby a stator 8 which is shown in FIG. 7 is obtained.

In the stator 8 which has been constructed in such a manner, the winding 2 of the first phase, the winding 3 of the second phase and the winding 4 of the third phase which constitute the armature coil 1 are accommodated at intervals of three slots with the slot accommodating parts 2a, 3a and 4a made shifted from each other by one slot to be wound on the stator iron core 5. Then, the bridging parts 2b of the winding 2 of the first phase are arranged, on the outer periphery side in the radial direction, on the end face of the stator iron core 5, the bridging parts 3b of the winding 3 of the second phase are arranged, on the inner periphery side in the radial direction, on the end face of the stator iron core 5, and the bridging parts 4b of the winding 4 of the third phase are arranged on the end face of the stator iron core 5 in such a way as to be shifted from the inner periphery side in the radial direction to the outer periphery side in the radial direction, thereby constituting the coil end group.

Then, since each of the winding 2 of the first phase, the winding 3 of the second phase and the winding 4 of the third phase is formed into the crank-like shape, the bridging parts 2b, 3b and 4b are arranged along the end face of the stator iron core 5 so that the axial height of the coil end group can be made low.

Since the conventional armature coil employs the coil segments each being formed into the U shape, there is a problem that the axial height of the coil end group is high and hence the stator can not be miniaturized.

In addition, in the armature coil 1 as the improvement measure, the winding 2 of the first phase, the winding 3 of the second phase and the winding 4 of the third phase which constitute the armature coil 1 are wound on the stator iron core 5 in such a way that the bridging parts 2b, 3b and 4b are arranged in the circumferential direction in the form of two rows arranged radially along the end face of the stator iron core 5. Then, the bridging parts 2b of the winding 2 of the first phase are arranged on the end face of the stator iron core 5 in such a way as to be located on the outer periphery side in the radial direction, the bridging parts 3b of the winding 3 of the second phase are arranged on the end face of the stator iron core 5 in such a way as to be located on the inner periphery side in the radial direction, and the bridging parts 4b of the winding 4 of the third phase are arranged on the end face of the stator iron core 5 in such a way as to be shifted from the inner periphery side to the outer periphery side in the radial direction. Then, there arises a problem that the lengths of the winding 2 of the first phase, the winding 3 of the second phase and the winding 4 of the third phase are different from one another, i.e., the resistance values of the windings of the three phases are unbalanced and hence the currents which are caused to flow through the windings of the three phases, respectively, become unbalanced. This unbalance in the currents which are caused to flow through the windings of the three phases, respectively, leads to undesirable torque fluctuation, noise and vibration.

SUMMARY OF THE INVENTION

In the light of the foregoing, the present invention has been made in order to solve the above-mentioned problems associated with the prior art and it is therefore an object of the present invention to provide a stator for a dynamo-electric machine in which an axial height of a coil end group is reduced to make miniaturization possible and the unbalance of currents which are caused to flow through the windings of the individual phases, respectively, can be suppressed.

In order to achieve the above object, according to one aspect of the present invention, there is provided a stator of a dynamo-electric machine including: a cylindrical stator iron core formed with a number of slots opening to the inner periphery side at a predetermined pitch in a circumferential direction; and an armature coil having windings of first, second and third phases which are wound in a wave winding manner into every third slot by offsetting the slots, into which the respective windings of the first, second and third phases are inserted, one slot, wherein the windings of the first, second and third phases constitute coil ends in which they protrude from first slot to an end face of the stator iron core outside the slots, extend along the end face of the stator iron core in the circumferential direction while maintaining the radial position, and then enter into second slot three slots away from the first slot, and wherein the coil ends are arranged in the circumferential direction in the form of two layers arranged radially on the end faces of the stator iron core to constitute coil end groups.

BRIEF DESCRIPTION OF THE DRAWINGS

The above and other objects as well as advantages of the present invention will become clear by the following description of the preferred embodiments of the present invention with reference to the accompanying drawings, in which.

DETAILED DESCRIPTION OF THE PREFERRED EMBODIMENTS

Preferred embodiments of the present invention will hereinafter be described in detail with reference to the accompanying drawings.

First Embodiment

Figure 1:
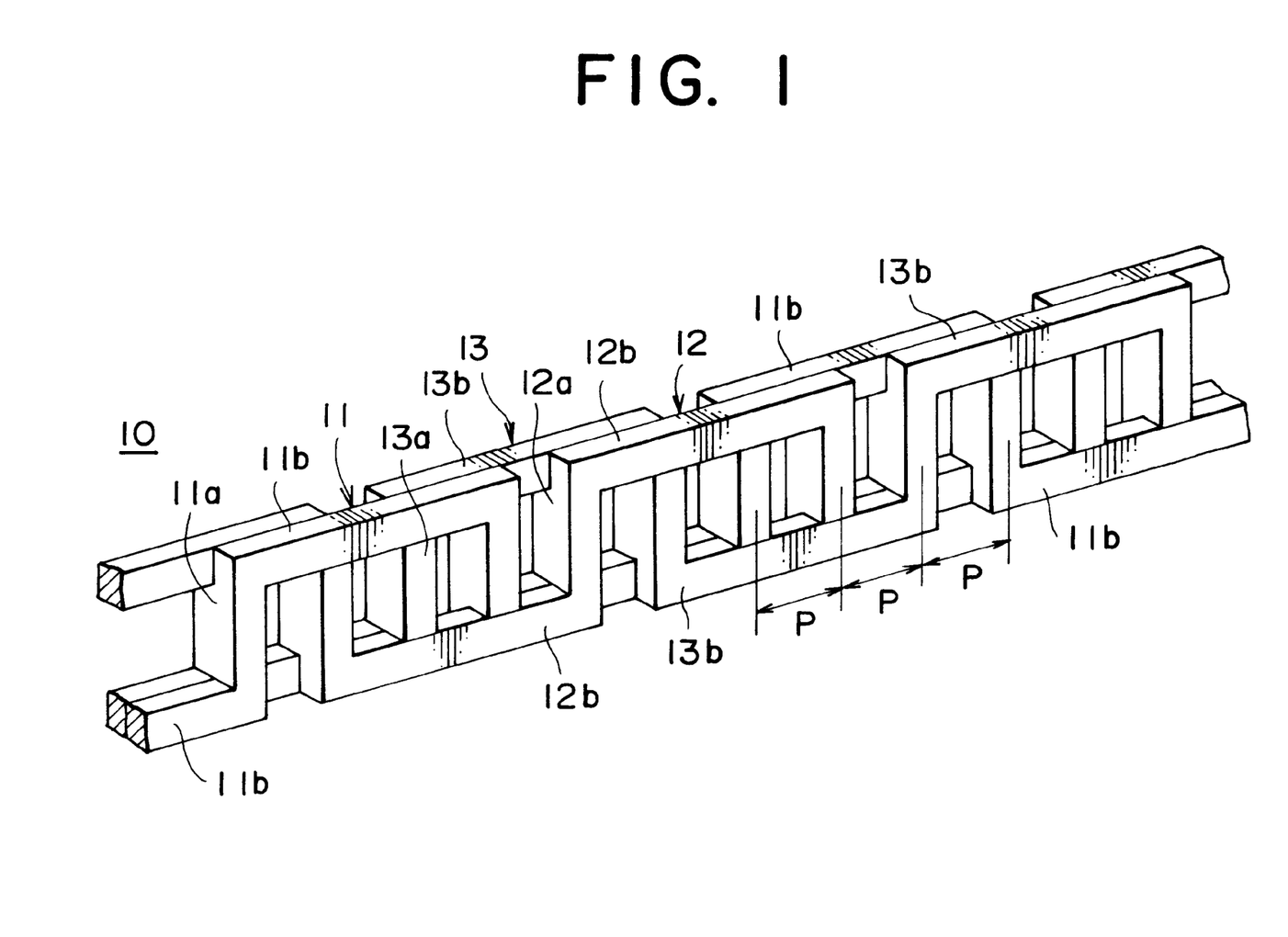
FIG. 1 is a developed perspective view showing a main part of an armature coil which is applied to a stator for a three phase induction electric motor according to a first embodiment of the present invention.
Figure 2:
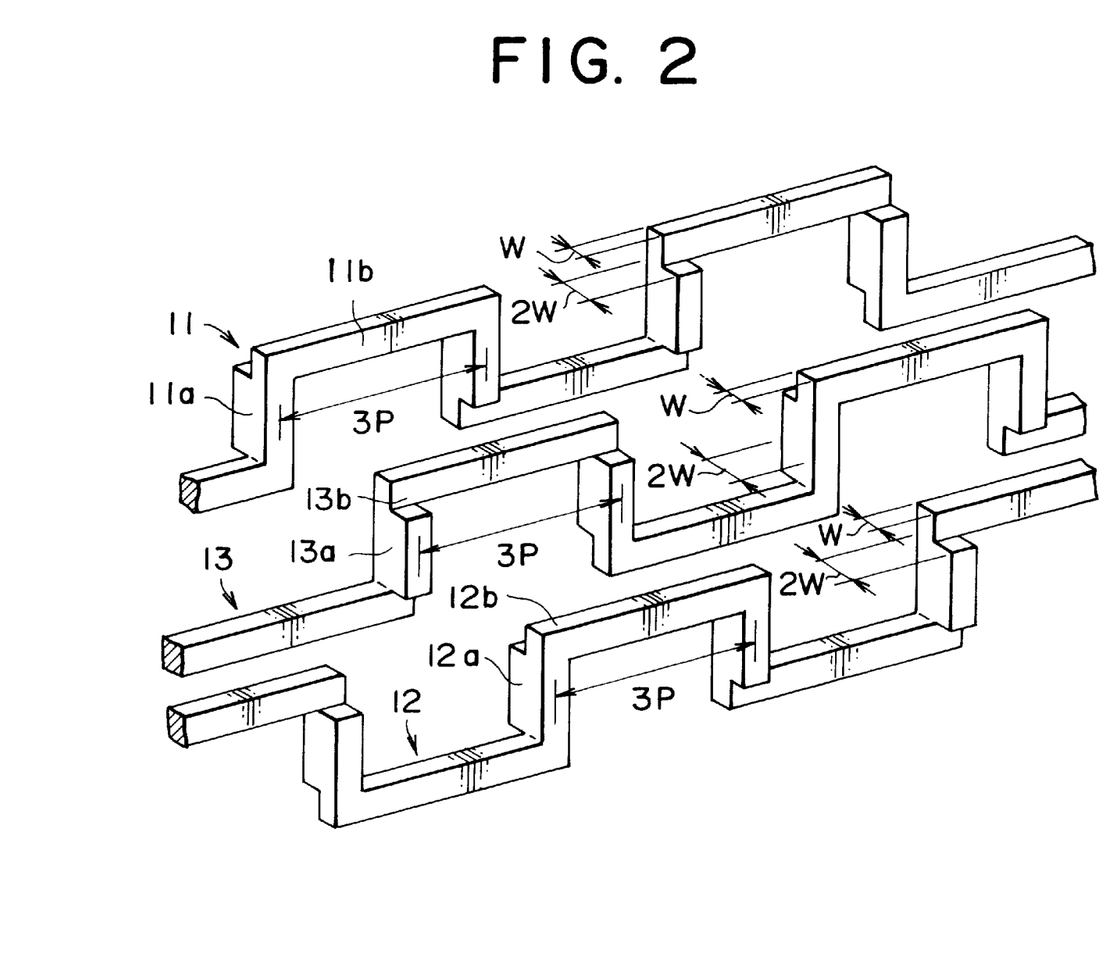
FIG. 2 is an exploded perspective view showing the construction of the armature coil shown in FIG. 1.

FIG. 1 is a developed perspective view showing a main part of an armature coil which is applied to a stator for a three phase induction electric motor according to a first embodiment of the present invention, and FIG. 2 is an exploded perspective view showing the construction of the armature coil shown in FIG. 1.

In FIGS. 1 and 2, an armature coil 10 is constituted of, for example, windings 11, 12 and 13 of first, second and third phases corresponding to a phase U, a phase V and a phase W, respectively. With respect to each of the winding 11 of the first phase, the winding 12 of the second phase and the winding 13 of the third phase, a group of a large number of copper wires, each of which is coated with enamel, and which are tied up in a bundle, are subjected to the press forming to be formed into a desired shape.

The winding 11 of the first phase is constructed into a crank shape which includes slot accommodating parts 11a which are arranged at predetermined pitches (3P) and bridging parts 11b as the coil ends through each of which the end portions of the adjacent slot accommodating parts 11a are coupled to each other. Then, each of the slot accommodating parts 11a is formed into the rectangular shape in cross section which has an outer diameter roughly equal to an inner diameter of the slot (not shown) of the stator iron core. In addition, each of the bridging parts 11b is formed in such a way that its width (w) in the direction of the slot depth is roughly half the width (2w) in the direction of the slot depth of the slot accommodating parts 11a. Thus, the end portions, on one side in the direction of the slot depth, of the adjacent slot accommodating parts 11a and the end portions, on the other side in the direction of the slot depth, of the adjacent slot accommodating parts 11a are alternately coupled to each other through the associated ones of the bridging parts 11b.

The winding 12 of the second phase is constructed into a crank shape which includes slot accommodating parts 12a which are arranged at predetermined pitches (3P) and bridging parts 12b as the coil ends through each of which the end portions of the adjacent slot accommodating parts 12a are coupled to each other. Then, each of the slot accommodating parts 12a is formed into the rectangular shape in cross section which has an outer diameter roughly equal to an inner diameter of the slot (not shown) of the stator iron core. In addition, each of the bridging parts 12b is formed in such a way that its width (w) in the direction of the slot depth is roughly half the width (2w) in the direction of the slot depth of the slot accommodating parts 12a. Thus, the end portions, on one side in the direction of the slot depth, of the adjacent slot accommodating parts 12a and the end parts, on the other side in the direction of the slot depth, of the adjacent slot accommodating parts 12a are alternately coupled to each other through the associated ones of the bridging parts 12b.

The winding 13 of the third phase is constructed into a crank shape which includes slot accommodating parts 13a which are arranged at predetermined pitches (3P) and bridging parts 13b as the coil ends through each of which the end portions of the adjacent slot accommodating parts 13a are coupled to each other. Then, each of the slot accommodating parts 13a is formed into the rectangular shape in cross section which has an outer diameter roughly equal to an inner diameter of the slot (not shown) of the stator iron core. In addition, each of the bridging parts 13b is formed in such a way that its width (w) in the direction of the slot depth is roughly half the width (2w) in the direction of the slot depth of the slot accommodating parts 13a. Thus, the end portions, on one side in the direction of the slot depth, of the adjacent slot accommodating parts 13a and the end portions, on the other side in the direction of the slot depth, of the adjacent slot accommodating parts 13a are alternately coupled to each other through the associated ones of the bridging parts 13b.

The winding 11 of the first phase, the winding 12 of the second phase and the winding 13 of the third phase which have been formed in such a manner as described above are arranged with the slot accommodating parts 11a, 12a and 13a made shifted from each other by one slot (P) to construct the armature coil 10 as shown in FIG. 1.

Figure 3:
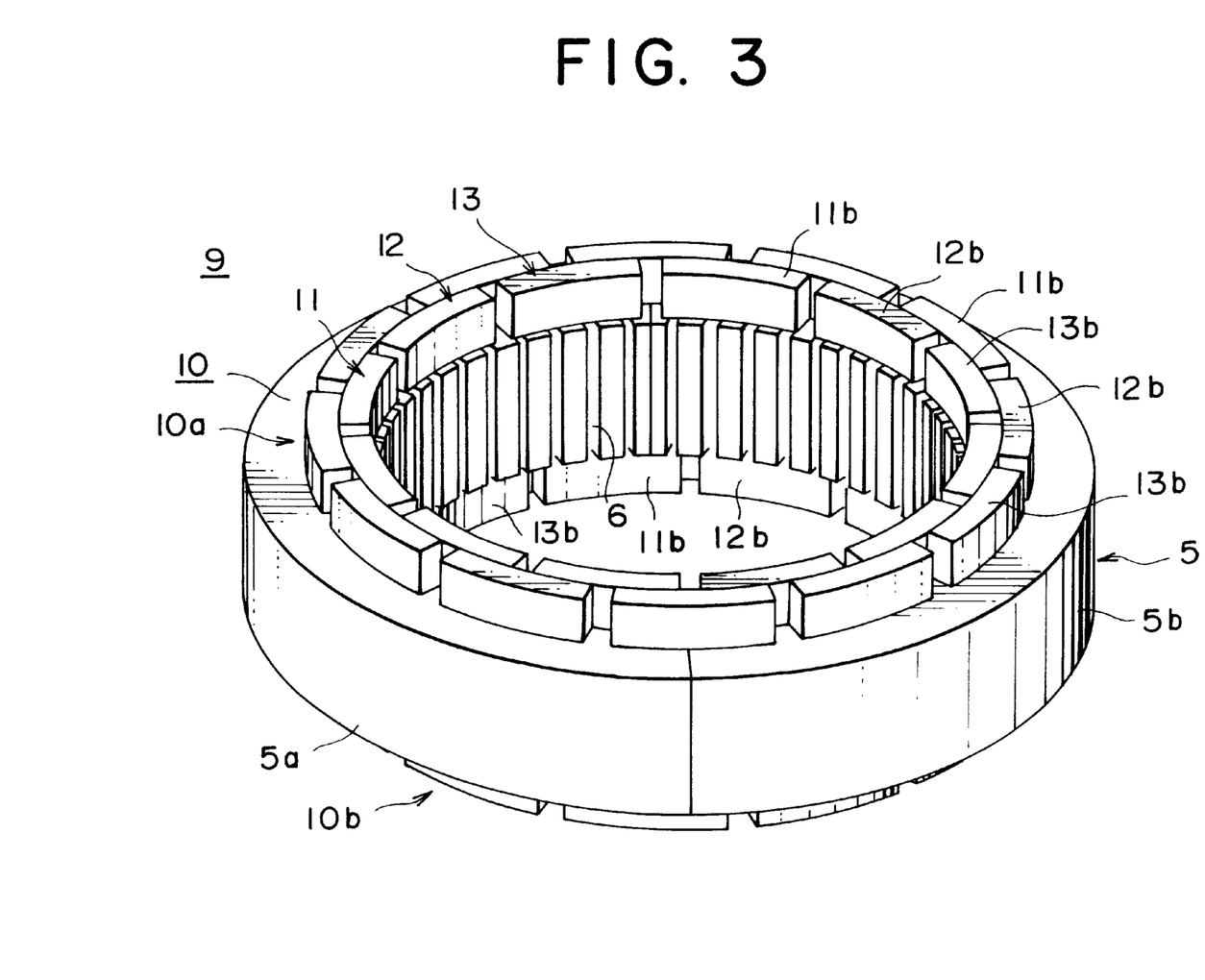
FIG. 3 is a perspective view showing the stator for the three phase induction electric motor according to the first embodiment of the present invention.

The armature coil 10 which has been constructed in such a manner as described above is formed into a ring-like shape by the bending. Then, divided stator iron cores 5a and 5b are applied from the outer periphery side to the ring-like shaped armature coil 10 in such a way that the slot accommodating parts 11a, 12a and 13a are respectively accommodated in the associated ones of the slots 6, and then the end faces of the divided stator iron cores 5a and 5b are brought into contact with each other to be integrated with each other by the welding, whereby a stator 9 which is shown in FIG. 3 is obtained.

In the stator 9 which has been constructed in such a manner as described above, the winding 11 of the first phase, the winding 12 of the second phase and the winding 13 of the third phase which constitute the armature coil 10 are accommodated at intervals of three slots with the slot accommodating parts 11a, 12a and 13a made shifted from each other by one slot to be wound on the stator iron core 5. Then, the bridging parts 11b of the winding 11 of the first phase are arranged in the circumferential direction on the end face of the stator iron core 5 in such a way as to take alternately the inner periphery side and the outer periphery side in the radial direction, the bridging parts 12b of the winding 12 of the second phase are arranged in the circumferential direction on the end face of the stator iron core 5 in such a way as to take alternately the inner periphery side and the outer periphery side in the radial direction, and the bridging parts 13b of the winding 13 of the third phase are arranged in the circumferential direction on the end face of the stator iron core 5 in such a way as to take alternately the inner periphery side and the outer periphery side in the radial direction.

Then, each of the coil end groups 10a and 10b of the armature coil 10 is constructed in such a way that the bridging parts 11b, 12b and 13b are arranged in the circumferential direction in the form of two layers arranged radially. Then, on the inner layer side of each of the coil end groups 10a and 10b, the bridging parts 11b, 12b and 13b are arranged in the circumferential direction such that the order thereof is bridging part 11b, bridging part 12b, bridging part 13b. On the other hand, on the outer layer side thereof, the bridging parts 11b, 12b and 13b are arranged in the circumferential direction such that the order thereof is bridging part 11b, bridging part 12b, bridging part 13b, the bridging parts being shifted with respect to the bridging parts on the inner layer side by six slots (6P).

According to the first embodiment, since each of the windings 11 of the first phase, the winding 12 of the second phase and the winding 13 of the third phase is formed into the crank-like shape, the bridging parts 11b, 12b and 13b are arranged along the end face of the stator iron core 5 so that the axial heights of the coil end groups 10a and 10b can be reduced and also the miniaturization of the stator 9 can be realized. In addition, since the axial heights of the coil end groups are reduced in such a manner, the leakage reactance of the coil of the coil end is reduced and also the output can be increased.

In addition, the bridging parts 11b, 12b and 13b are formed in such a way as to protrude from first slot 6 to extend in the circumferential direction along the end face of the stator iron core 5 while maintaining the radial position to enter into second slot 6 three slots away from the first slot 6, and also the bridging parts 11b, 12b and 13b are arranged in the circumferential direction in the form of two layers arranged radially on the end face of the stator iron core 5. Therefore, the lengths of the winding 11 of the first phase, the winding 12 of the second phase and the winding 13 of the third phase become roughly equal to one another and also the resistance values of the winding 11 of the first phase, the winding 12 of the second phase and the winding 13 of the third phase are roughly equal to one another. As a result, when connecting the winding 11 of the first phase, the winding 12 of the second phase and the winding 13 of the third phase in accordance with the three phase connection, the currents which are caused to flow through the winding 11 of the first phase, the winding 12 of the second phase and the winding 13 of the third phase, respectively, are balanced. As a result, it is possible to suppress the torque fluctuation, the noise and the vibration due to the unbalance of the currents which are caused to flow through the windings of the first, second and third phases in the prior art.

In addition, on the inner layer side of each of the coil end groups 10a and 10b, the bridging parts 11b, 12b and 13b are arranged in the circumferential direction such that the order thereof is bridging part 11b, bridging part 12b, bridging part 13b. On the other side, on the outer layer side of each of the coil end groups 10a and 10b, the bridging parts 11b, 12b and 13b are arranged in the circumferential direction such that the order thereof is bridging part 11b, bridging part 12b, bridging part 13b, the bridging parts being shifted by six slots (6P) with respect to the bridging parts on the inner layer side. Therefore, it is possible to obtain the armature coil 10 in which the lengths of the winding 11 of the first phase, the winding 12 of the second phase and the winding 13 of the third phase are roughly equal to one another.

Second Embodiment

Figure 4:
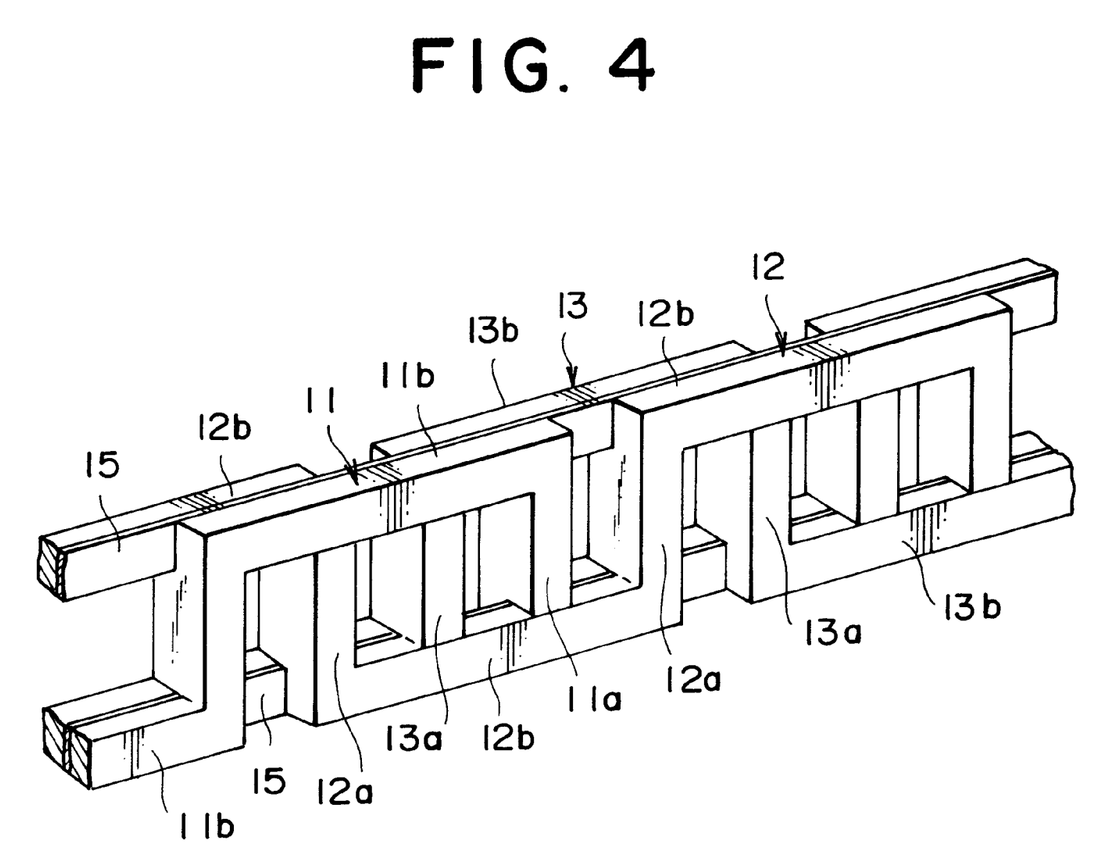
FIG. 4 is a developed perspective view showing a main part of an armature coil which is applied to a stator for a three phase induction electric motor according to a second embodiment of the present invention.

FIG. 4 is a developed perspective view showing a main part of an armature coil which is applied to a stator for a three phase induction electric motor according to a second embodiment of the present invention.

In the second embodiment, an insulator 15 is inserted between the bridging parts 11b, 12b and 13b on the inner layer side and the bridging parts 11b, 12b and 13b on the outer layer side.

In this connection, other construction is the same as that in the above-mentioned first embodiment of the present invention.

In the second embodiment, the insulation among the winging 11 of the first phase, the winding 12 of the second phase and the winding 13 of the third phase in the coil end groups 10a and 10b can be ensured.

Now, the bridging parts 11b, 12b and 13b are formed in such a way as to protrude from first slot 6 extend in the circumferential direction along the end face of the stator iron core 5 while maintaining the radial position to enter into second slot 6 three away from the first slot 6, and also the bridging parts 11b, 12b and 13b are arranged in the circumferential direction in the form of two layers arranged radially on the end face of the stator iron core 5. Therefore, the bridging parts 11b, 12b and 13b on the inner layer side are parallel with the bridging parts 11b, 12b and 13b on the outer layer side and hence the insertion of the insulator 15 therebetween is easy to carry out. Also, the interphase insulation becomes possible by using one sheet of insulator for each of the coil end groups 10a and 10b.

While in the above-mentioned first and second embodiments, the description has been given in such a way that the present invention is applied to the stator for the three phase induction electric motor, the present invention is not restricted to the three phase induction electric motor alone. That is, if the present invention is applied to a stator for any other dynamo-electric machines such as an A.C. generator, the same effects can be acquired.

In addition, while in the first and second embodiments, a group of copper wires each of which is coated with enamel are tied up in a bundle to be subjected to the press forming to form the wiring 11 of the first phase, the wiring 12 of the second phase and the wiring 13 of the third phase, the wiring 11 of the first phase, the wiring 12 of the second phase and the wiring 13 of the third phase may be formed by subjecting one copper wire material coated with enamel to the press forming.

Since the present invention is constructed in such a manner as described above, the following effects can be acquired.

According to the present invention, there is provided a stator for a dynamo-electric machine including: a cylindrical stator iron core formed with a number of slots opening to the inner periphery side at a predetermined pitch in a circumferential direction; and an armature coil having windings of first, second and third phases which are wound in a wave winding manner into every third slot by offsetting the slots, into which the respective windings of the first, second and third phases are inserted, one slot, wherein the windings of the first, second and third phases constitute coil ends in which they protrude from a first slot to an end face of the stator iron core outside the slots, extend along the end face of the stator iron core in the circumferential direction while maintaining the radial position, and then enter into a second slot three slots away from the first slot, and wherein the coil ends are arranged in the circumferential direction in the form of two layers arranged radially on the end faces of the stator iron core to constitute coil end groups. As a result, it is possible to obtain a stator for a dynamo-electric machine in which the unbalance of the currents which are caused to flow through the winding of the first phase, the winding of the second phase and the winding of the third phase, respectively, can be suppressed, and also the miniaturization can be realized.

In addition, the coil end of said winding of the first phase, the coil end of said winding of the second phase and the coil end of said winding of the third phase, which are positioned on the inner layer side of said coil end groups, are arranged in the circumferential direction such that the order thereof is coil end of said winding of the first phase, coil end of said winding of the second phase, and coil end of said winding of the third phase, and wherein the coil end of said winding of the first phase, the coil end of said winding of the second phase and the coil end of said winding of the third phase, which are positioned on the outer layer side of said coil end groups, are arranged in the circumferential direction such that the order thereof is coil end of said winding of the first phase, coil end of said winding of the second phase, and coil end of said winding of the third phase, the coil end of said winding of the first phase, the coil end of said winding of the second phase and the coil end of said winding of the third phase being shifted on the outer layer side of said coil end groups by six slots with respect to the coil ends on the inner layer side of said coil end groups. Therefore, it is possible to realize readily an armature coil in which the lengths of the winding of the first phase, the winding of the second phase and the winding of the third phase are roughly equal to one another.

In addition, since an insulator is inserted between the coil end, on the inner layer side, of the above-mentioned coil end groups and the coil end, on the outer layer side, of the above-mentioned coil end groups, the insulation among the windings of the first, second and third phases can be surely ensured.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A stator of a dynamo-electric machine, comprising:
   a cylindrical stator iron core formed with a number of slots opening to the inner periphery side at a predetermined pitch in a circumferential direction; and
   an armature coil comprising windings of first, second and third phases which are wound in a wave winding manner into every third slot by offsetting the slots, into which said respective windings of the first, second and third phases are inserted, by one slot,
   wherein said windings of the first, second and third phases include coil ends that protrude from a first slot to an end face of said stator iron core outside the slots, extend along the end face of said stator iron core in the circumferential direction while maintaining a radial position, and then enter into a second slot three slots away from the first slot, and
   wherein said coil ends are arranged in the circumferential direction in the form of two layers arranged radially on the end faces of said stator iron core to constitute coil end groups.

2. A stator of a dynamo-electric machine according to claim 1, wherein the coil end of said winding of the first phase, the coil end of said winding of the second phase and the coil end of said winding of the third phase, which are positioned on an inner layer side of said coil end groups, are arranged in the circumferential direction such that the order thereof is coil end of said winding of the first phase, coil end of said winding of the second phase, and coil end of said winding of the third phase, the coil end of said winding of the first phase, the coil end of said winding of the second phase and the coil end of said winding of the third phase, which are positioned on an outer layer side of said coil end groups, are arranged in the circumferential direction such that the order thereof is coil end of said winding of the first phase, coil end of said winding of the second phase, and coil end of said winding of the third phase, and the coil end of said winding of the first phase, the coil end of said winding of the second phase and the coil end of said winding of the third phase are shifted on the outer layer side of said coil end groups by six slots with respect to the coil ends on the inner layer side of said coil end groups.

3. The stator of a dynamo-electric machine according to claim 2, wherein an insulator is inserted between the coil ends on the inner layer side of said coil end groups and the coil ends on the outer layer side of said coil end groups.

4. The stator of a dynamo-electric machine according to claim 1, wherein a length of each of said winding of the first phase, said winding of the second phase and said winding of the third phase is substantially equal.

5. The stator of a dynamo-electric machine according to claim 1, wherein a resistance value of each of said winding of the first phase, said winding of the second phase and said winding of the third phase is substantially equal.

6. The stator of a dynamo-electric machine according to claim 1, wherein a current flowing through each of said winding of the first phase, said winding of the second phase and said winding of the third phase is substantially equal.

* * * * *